Dec. 24, 1946. W. J. MILLER ET AL. Re 22,823
METHOD AND APPARATUS FOR APPENDAGING POTTERYWARE
Original Filed May 7, 1941 2 Sheets-Sheet 1
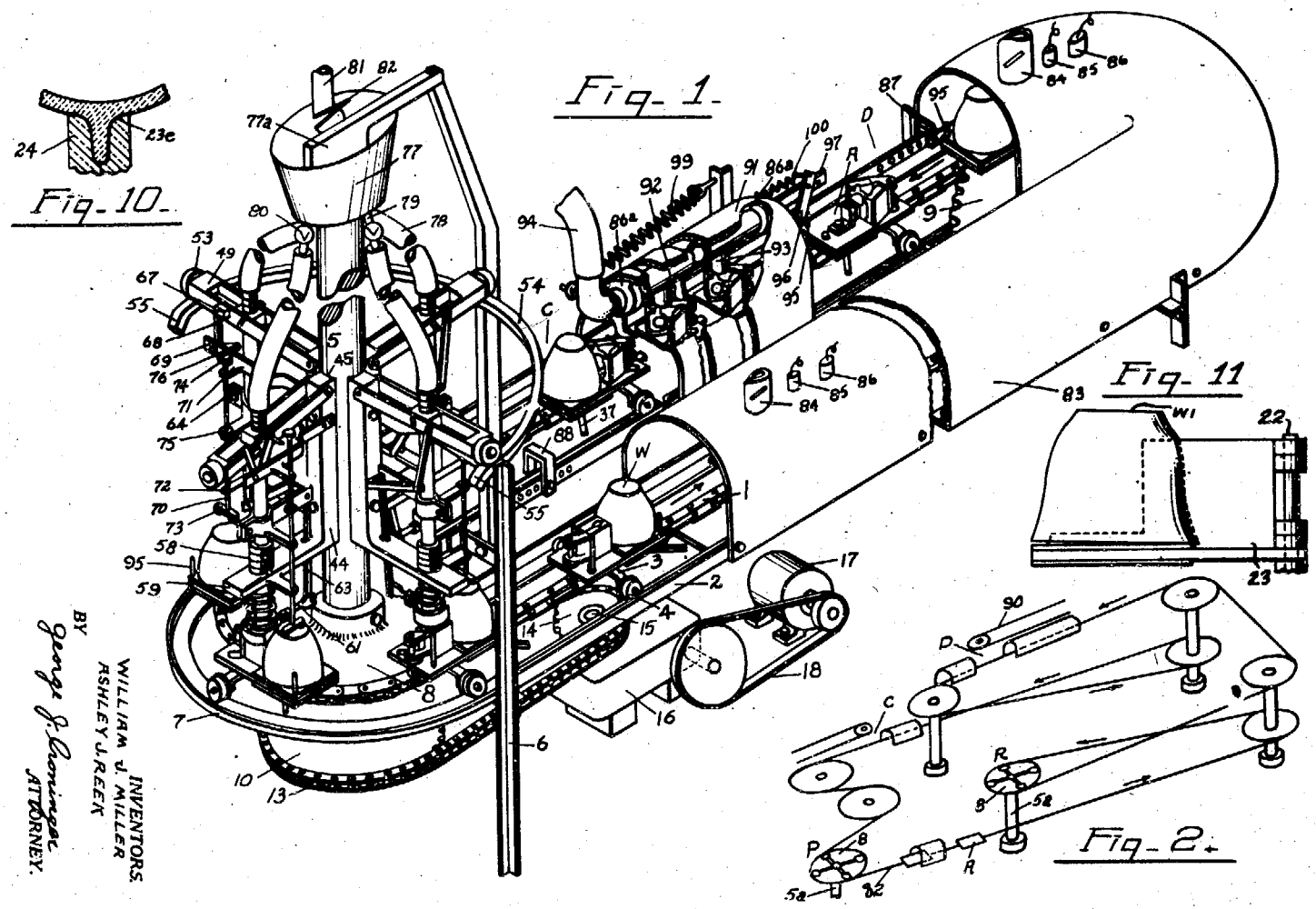
INVENTORS.
WILLIAM J. MILLER
ASHLEY J. REEK
BY
George J. Croninger
ATTORNEY.

Dec. 24, 1946. W. J. MILLER ET AL Re 22,823

METHOD AND APPARATUS FOR APPENDAGING POTTERYWARE

Original Filed May 7, 1941 2 Sheets-Sheet 2

INVENTORS
WILLIAM J. MILLER
ASHLEY J. REEK
BY
George J. Croninger
ATTORNEY.

Reissued Dec. 24, 1946 Re. 22,823

UNITED STATES PATENT OFFICE 22,823

METHOD AND APPARATUS FOR APPENDAGING POTTERYWARE

William J. Miller, Frankstown Estates, Pa., and Ashley J. Reek, Jonesboro, Ind., assignors, by direct and mesne assignments, to Miller Pottery Engineering Company, Swissvale, Pa., a corporation of Pennsylvania Original No. 2,349,292, dated May 23, 1944, Serial No. 392,276, May 7, 1941. Application for reissue August 24, 1946, Serial No. 692,741

35 Claims. (Cl. 25—22)

This invention relates to new and improved methods and apparatus for appendaging pottery ware.

In the conventional method of appendaging pottery ware, the appendages, for instance, cup handles, are cast in molds capable of forming several appendages simultaneously all joined to a common stem. The slip (a fluid mixture of ceramic material) flows into the appendage cavities through large branch ducts in each mold. After an appropriate interval, usually a half hour or so, the handles are sufficiently hardened for removal. Each handle must be broken off the stick by hand and the attaching face shaped to fit the contour of the article. About as much scrap clay is produced as there is clay in the handles. The fin running around the seam of the appendage is fettled off and the entire appendage lightly gone over with a moist sponge to smooth it. After an indefinite period of storage in a moist humid atmosphere, the handle is then ready for attachment to the article and this is accomplished by coating the terminal with slip and then applying it free hand against the ware. Any surplus slip must then be wiped off with a sponge. In the foregoing system, there is a considerable amount of manual carrying back and forth which is laborious and timestaking. Furthermore, the process is wasteful of clay and does not insure uniform handles or precise location thereof on the ware.

In United States Patent No. 2,217,346 to William J. Miller, there is disclosed an improved and much more dependably accurate and simplified method and apparatus for slip casting appendages wherein a separable appendage mold and prefabricated article are cooperated in such fashion as to bring the cavity opening of the mold into registry with the place on the receptacle determined upon for the appendage; afterwards the mold is filled with slip and the ware and mold remain together until the appendage unites with the article and hardens to optimum degree. Thus, the appendaging is done in one simple and easy operation, as compared with the manual process.

The present application has to do with a new and improved system and apparatus for displacing labor in the practical commercial manufacture of appendaged pottery ware, utilizing the method of slip casting as described in the preceding paragraph. This invention also includes, among other things, new and improved methods and apparatus for automatically manipulating, circulating and drying molds, setting appendages and feeding slip to molds. All are exceptionally useful in the continuous, closed cycle, high speed, mass-manufacture of appendaged pottery ware.

This invention also contemplates the manufacture, in rapid succession, of similar or diverse appendages formed and united to ware of similar or diverse character. It also makes possible economical line production of appendaged ware in small or large quantities, with elimination of labor and complicated mechanism. The ability to meet the varied demands of daily production by mass-producing diversified appendaged ware economically is highly advantageous to any pottery, whether large or small.

In the drawings:

Figure 1 is a perspective broken view of the preferred form of apparatus for practicing the method hereof.

Figure 2 is a diagrammatic illustration of a mold conveying system for use, if desired, in connection with the apparatus of Figure 1.

Fig. 10 is a detail in section showing how the mold may be filleted.

Fig. 11 is an elevation showing how ware may be tilted into sealed engagement with the mold.

Figure 3:
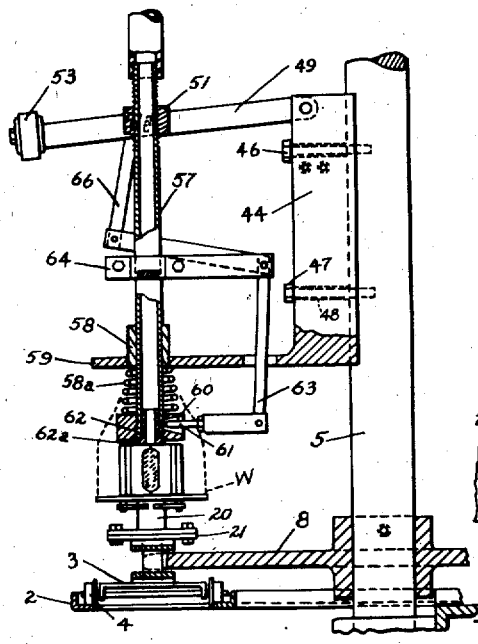
Figure 3 is a vertical section through one of the slip feeders.

The drawings illustrate how handles are formed and united to prefabricated cups. The invention is not limited, however, to handling cups, since it may be used to appendage other forms of pottery articles with appendages, protuberances, lugs and the like of various shapes, sizes, composition and description which may be located at various points on the article.

The apparatus shown in Fig. 1 consists generally of a casting machine and a conveyor associated therewith for transporting appendage casting molds and ware. The conveyor preferably comprises a single strand endless chain 1 which may travel in a horizontal plane, Fig. 1, in an undulatory path or partly in vertically ascending and descending undulating or helical courses, to conserve floor space as diagrammatically shown in Fig. 2, the latter arrangement being preferred. The angle of inclination of the slanting courses of the chain, Fig. 2, are such that the slip will not spill out of the casting molds attached to the chain and the chain will be guided onto the sprockets in such fashion as to prevent binding and abnormal wear on either the chain or the sprockets.

The chain 1 is centered and supported on the twin rails of a track 2 by means of underneath transverse supports 3 having flanged wheels 4 resting on the track. 5 is a vertical shaft rotatably mounted on the frame 6 of the machine concentric with a curved section 7 of the track 2. A sprocket 8 with teeth closely fitting the chain openings is secured to the shaft for rotation therewith over which the chain conveyor passes to one or more idler sprockets 9 along the length thereof.

Shaft 5 is continuously rotated by sprocket 10 which is keyed thereon and rotated by chain 13 and sprocket 14 on shaft 15 of adjustable speed reducer 16. Power is supplied by motor 17 and belt drive 18.

The minimum length of conveyor chain is calculated by first obtaining the time required for a handle made of proper gravity and composition casting slip to harden the desired degree in the mold of a casting unit. Next the number of mold fillings to be made per minute is determined. For instance, if thirty minutes is required for the handle to harden and the production per minute is 70 then 2100 casting units will be the minimum number required for continuous production. The allowable center to center spacing times the number of casting units gives the length of the chain in inches. For example, 2100 casting units on 7'' centers would make the minimum length of chain 1225 feet. In practice about 50% more chain fully equipped with casting molds is added to the minimum chain length to provide for the additional time to dry molds and transport them through loading, unloading and filling stations. The foregoing calculations are illustrative only.

Figure 5:
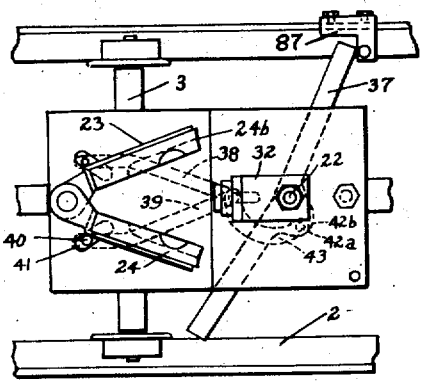
Figure 5 is a top plan view of the separable casting molds, ware support and mold actuating mechanism.
Figure 6:
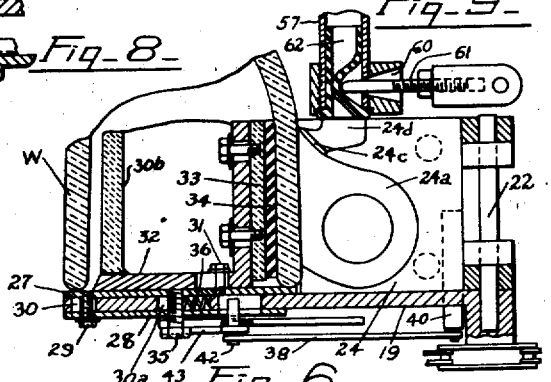
Figure 6 is a longitudinal vertical section of a feeder or nozzle casting and ware support assembly in casting position.

With reference to Figs. 5 and 6, each casting unit A comprises a base plate 19 having a depending center rib 20, Fig. 3, secured to a horizontal plate 21 fastened to the chain 1. A hinge pin 22 is secured in plate 19, Fig. 6, on which rigid frames 23 of a partible mold assembly are pivotally mounted.

Each frame 23 has one half of a mold 24 (preferably made of absorbent material such as hydrocal or plaster of Paris) cemented or removably secured as by screws thereto. The mold may be cast against the perforated frame 23 with the frames themselves forming two sides of the case. A cavity core (not shown) with flanged vertical portion contoured as the cup may be used to close the open side of the frames 23 and divide same into two sections. After the bottom and other side of the case is closed with ordinary strips of material, each section is filled with liquid plaster. After the plaster has hardened, the core is removed, leaving the mold in two halves as shown in Fig. 5.

If desired, the mold sections may be cast in suitable cluster cases remote from the machine. In such event, the sections could be formed with a tongue for insertion in slightly larger tapered dovetailed slots in frames 23. While the frames 23 are not shown with dovetailed slots, the construction is quite obvious. This will enable replacement of molds without interrupting the operation of the machine or dissembling of machine parts.

Each mold section has a ware engaging surface 24*b*, contoured to fit the external surface of the ware and when the mold is closed, a trough-like surface is presented to the ware. If the ware has little or no vertical curvature in the zone to be appendaged (see Fig. 6), the ware may be moved into nested relation with the trough-like surface by movement in the plane in which it lies.

In the case of ware W1 (Fig. 11) having vertical curvature in the zone to be appendaged, it is preferred to have the trough-like surface tilted away from the ware in such a way that the ware will be caused to tilt on its brim into seated relation with the mold thus raising the rear of the ware off the platform. I have found this to provide a limited amount of free floating action between the cup and the internal support therefor which appears to facilitate seating and sealing thereof against the mold. It also tends to minimize distorting or stretching the ware out of shape.

Figure 8:
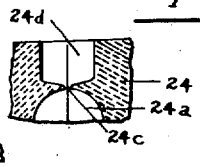
Fig. 8 is a fragmentary section showing the restricted passage between the mold cavity and filling opening.
Figure 9:
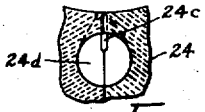
Fig. 9 is a fragmentary section looking down on top of the restricted passage.

Since the mold is divided, each part is formed with one-half of the molding cavity and an inlet passage leading thereto. Thus, when the mold is closed, that portion of the cavity shown at 24*a*, Fig. 6, forms the moulding chamber which may be of any desired contour, and 24*d* is a reserve feeding well (filling opening) of whatever capacity may be required. The moulding chamber and well are connected by a shallow orifice 24*c* somewhat on the order of a slit of such area and contour that it will not clog, see Figs. 8 and 9. The orifice is located so as to feed into the uppermost portion of the inverted appendage cavity (consequently the lower and less conspicuous portions) to thereby avoid air entrapment and feed into the zone where the greater bulk of the appendage that solidifies last is located.

By virtue of this construction, the material remaining in the reserve well after the appendage has solidified is connected to the appendage by a portion of comparatively small area. This portion must be strong enough to withstand breakage when the mold is opened because the material remaining in the well may have a fluid center and it is important to avoid breakage lest the mold or ware become fouled. Furthermore, this portion will break off flush with the surface of the appendage when removal is attempted. This is preferably done with the same hand and as part of the operation of removing the ware from the conveyor. The technique is to grasp the cup around the body, leaving the handle free and then snap it with a quick wrist motion. The well material, due to its inertia breaks off clean leaving the surface of the appendage smooth or substantially so and thereby eliminating or minimizing the need for manual smoothing. The scrap can be caught in a conveniently disposed container.

To control the speed of solidification within the orifice 24*c*, a medium capable of retarding water absorption to an optimum degree may, if desired, be applied to the apex of the orifice and immediate vicinity. This medium may be a coating such as shellac or inserts (not shown) having the proper characteristics as determined by tests in each diverse type. To reduce the bulk or volume of material retained in the well 24*d* (and subsequently discarded) the walls of the well, in whole or in part, may likewise be treated to control and prevent the accumulation of an excessive thickness of material thereon.

It will be observed that there are no dowels in the mating faces of the mold sections 24. The mold sections are located by the backs 23 which in turn rotate about the hinge pin as a fixed axis. Dowels and their holes add expense to the manufacture of the molds and are hard to keep clean. Any dirt in a dowel hole will spring the mold and cause it to leak.

Another point to be noted is that the wall of the cavity opening is filleted as at 23*e*, Fig. 10. This not only enhances the appearance of the finished product by curving the lines of the appendage into the ware but it provides broader footing and hence a stronger bond. It will be understood that the fillet, while preferred, is not altogether necessary and straight sided handles may just as easily be formed and applied.

A guided, freely sliding, carriage composed of upper and lower plates 27 and 28, Fig. 6, straddles the base plate 19 and is secured together by bolt 29 which extends through an elongated opening 30 in plate 19 to thereby enable limited horizontal shifting.

A stud 35 threaded into plates 27 and 28 passes through an oversize aperture 30*a* in plate 19 to permit limited relative movement of the carriage and plate 19. A coil spring 36 bearing against stud 35 holds the carriage retracted. Adjustably secured to the carriage by bolt 31 is L shaped thrust member, sometimes herein called "thrustor" 32, having a replaceable plaster facing 33 preferably contoured to the shape of the cup cavity to which a resilient pad 34 is secured. The pad 34 faces the cavity opening in the mold and is spaced approximately the thickness of the cup wall from the opening in the mold, when the thrustor is in retracted position. It is adapted to press the wall of the cup against said cavity opening when the cup is held in casting position. To prevent the application of smaller diameter ware than the unit is suited for, the thrust member 32 may have a gauge means in the form of vertical member 30*b*.

Said pad 34 is preferably composed of a low density resilient material, such as, sponge rubber or it may be a resilient cavitated pad filled with fluid. The object is to provide a self-aligning surface that will fit the contour of the ware and will compensate for variations in wall thickness thereof. Thus the ware does not have to be gauged for wall thickness or curvature and can be placed on the appendaging machine in whatever condition it comes from the dryer as long as the shape is uniform. A narrow slightly projecting rim around the cavity opening in the mold will improve sealing contact and will produce cleaner juncture lines.

The importance of a self-aligning "thrustor" is emphasized by the fact that the exterior of the cup is formed by a mold, therefore, it is always of uniform contour, but not necessarily diameter because the mold wears after a while. The exterior of the cup is formed by an edge profile blade which through wear, re-shaping or resetting may change the internal shape, contour and wall thickness of the ware. Variations in wall thickness up to 20% have been known to occur and the zones of occurrence are apt to vary. Cast cups also vary in wall thickness and therefore, the provisions of a yieldable backing up or support member is highly advantageous particularly in commercial production.

Pivoted on the lower end of stud 35 is a double-ended mould opening and closing lever 37. The mold is opened and closed and the carriage 27—28 is shifted by links 38 and 39 that are attached to depending pins 40 secured to the frames 23 extending through slots 41 in the plate 19. Links 38 and 39 are pivotally attached to a common pin 42 attached to a crescent shaped link 43 pivotally connected to a crank extension 42*b* near the center of the lever 37. The opposite ends of the lever project beyond the marginal edges of plate 19.

When the lever 37, Fig. 5, is moved in a counterclockwise direction, links 38 and 39 pull the mold sections closed. After the sections are closed further movement of the lever 37 pulls the carriage assembly 27—28 to left against resistance of spring 36 thus forcing the ware W gently but firmly into leak-proof sealing relation with the mouth of the mold cavity. Further movement of lever 37 moves pin 42*a* over dead center thus locking the carriage assembly and mold sections in closed position pin 22 acting as a stop on link 43. When the opposite end of the lever 37 is moved in a clockwise direction, the ware W is first unclamped and is free to float as the mold starts to open, thus avoiding cracking of appendage at juncture if there should be a slight lateral shifting of mold due to worn hinge or link pin bearings.

Slip is fed to the appendage molds while they are traveling around a sprocket in a loop or bend of the track. Feeding stations may, if desired, occur at more than one point along the track as diagrammatically illustrated at P and R in Fig. 2. The object of having more than one feeding station is to replenish the supply of clay in the mold well if the well is not large enough to hold an adequate supply or for other purposes as detailed later.

The feeders are assembled on shaft 5 in Fig. 1 and shafts 5 and 5*a* in Fig. 2, in the latter view diagrammatically only. The number, location and spacing of feeders corresponds to that of one or more groups of molds. While the entire production may be the same, in the making of a diversified production, wherein the size and shape of appendage and/or ware may vary in successive order, the molds are arranged in groups, each group having the same number and each mold occupying the same position in corresponding groups. The number of feeders correspond to the number of molds in a group and are arranged to serve the same mold in each group. The circumference of the feeder sprocket is divisible by the length of chain required to seat a group of molds. Thus, for example, if the molds are on 8'' centers and the bend or loop (sprocket) is six feet in circumference then a group of molds will comprise 9 molds. In a 2,700 foot chain there would be 300 groups of molds and there would be nine feeders arranged on 40° centers. Thus each feeder can be tooled and adjusted to serve a particular type of ware to the best advantage.

Figure 4:
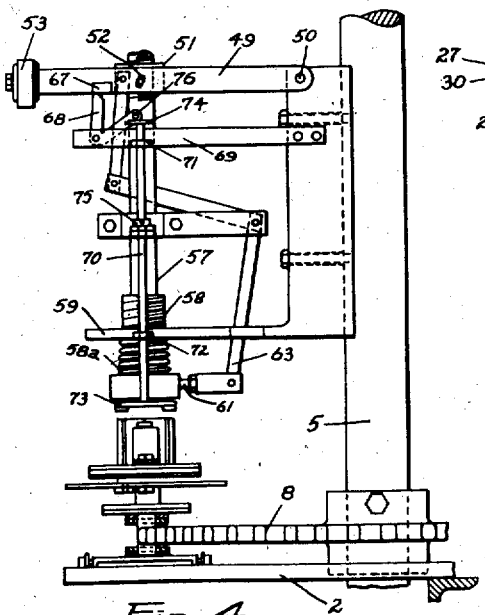
Figure 4 is a side elevation of the apparatus of Figure 3 illustrating how the feeding apparatus is held inoperative in case no ware has been applied.

In Figs. 3 and 4, we show how each feeder assembly is adjustably secured to the center shaft 5. All the feeders are identical in construction and therefore only one will be described in detail. A vertically disposed base member 44 is contoured at 45 to fit the circumference of the shaft 5 and is secured thereto by screws 46 and 47 through over-size holes 48 to permit slight vertical and circumferential adjustment. A duplex lever arrangement 49 is pivoted at 50 to the base 44 and intermediate the ends thereof is a feed pipe support 51 trunnioned in elongated vertical slots 52 in the levers which permits a limited amount of vertical lost motion between the pipe and the levers. To the unsecured end of the lever arrangement, a roller 53 is pivotally mounted and adapted to ride on a semi-circular stationary track 54, Fig. 1, provided with downwardly inclined ends 55 supported from the frame on posts 6. When the roller rides along the track the feeder is elevated and the flow of slip automatically shut off; when the roller is out of engagement with the track the feeder is in a lowered position and the flow of slip is automatically turned on or it remains shut off depending on whether or not a piece of ware is in place on the support, as described in detail later on.

Suspended in threaded adjustable engagement with feed pipe support 51 is the feed pipe 57 which extends loosely through a bushing 58 threaded into a horizontal extension 59 of the base member 44. A tapered radial bore 60 in the enlarged head of the pipe 57 permits access of an adjustable length plunger 61 to a flexible tube 62 telescoped within the bore of the pipe 57. The lower end of the tube is enlarged at 62a to form a resilient gasket for sealing the brim of the tube bore around the brim of the well 25. The plunger and tube arrangement serves as a valve for intermittently closing off the flow of slip to the mold and to actuate the plunger 61 it is pivoted to one leg of a bell crank 63 which is pivotally secured to a bracket 64, adjustably clamped to the pipe 57. A link 66 pivoted to the other leg of the bellcrank 63 and to the duplex lever 49 serves to retract the plunger after the feed pipe is in cooperation with the mold. The operation is such that at the completion of the charging operation and before the pipe 57 and gasket 62a is lifted to break the seal the plunger is projected against the tube to shut off the flow of slip. This lag in functioning in both directions is due to the lost motion between the support 51 and the levers 49. The degree of contact pressure between the gasket 62a and the mold is adjustable through threaded bushing 58 and spring 58a.

To selectively prevent functioning of a feeder when no ware is applied, we provide an abutment 67, Fig. 4, on one of the levers 49 which normally seats on the end of vertical leg of bellcrank 68 pivoted to horizontal extension 69 of the base 44. A pitman 70 is slidingly guided in vertically aligned bores in brackets 71 and 72, Fig. 1, of brackets 59 and 69. A replaceable cup contact member 73 having a soft facing is adjustably secured to the lower end of the pitman and an enlarged head 74 is secured to the upper end of the pitman. Intermediate the ends of the pitman an adjustable position collar 75 is secured to limit the pitman's lowermost limit of travel. The horizontal leg of bellcrank 68 has a portion 76 projecting over the head 74. Contact member 73 is adjusted to clear the ware when in elevated position and contact the ware prior to seating of gasket 62a on mold top to thereby tilt the bellcrank sufficient to cause the vertical bellcrank leg to clear the abutment 67 and thus permit lever 49 to continue its full down travel, open the valve and charge the molding cavity. If a cup is not in position, the descent of pitman 70 with the lever 49 will not be checked and therefore the bellcrank 68 will remain in alignment with the abutment 67, thus preventing descent of lever 49 and retraction of the plunger 61.

Slip is supplied to the feeding mechanism by gravity flow from a container 77 secured to top of shaft 5 through hoses 78 clamped to container nipples 79 and pipes 57. Each feeder has a control valve 80 for regulating the rate of flow of slip into the mold. Slip is supplied to the container from an agitated source of supply through a centered pipe 81 and an optimum level in the container is maintained by float valve 82. A stationary paddle 77a supported by one of the frame verticals keeps the slip in the container agitated. The container can be divided into several compartments, if it is desired to feed different grades and mixtures of slip. To supply these compartments with slip, supply pipes such as 81 could be arranged adjacent the rim of the container and a lever provided to trip a valve each time the compartment registered with the pipe. The container 77 may be of any desired capacity.

The system operates as follows: The ware is jiggered or cast in molds, preferably by automatic machine, such as that shown in the patent to William J. Miller, 2,046,525. These jiggering and/or casting molds are transported on a conveyor represented by 82, Fig. 2, through a dryer (not shown) and when the ware is leatherhard, it is removed through an opening of the dryer which is preferably located adjacent the loading point C of the appendaging machine, manually topped and sponged and then placed directly on the correct appendaging unit.

Starting with the prefabricated ware in inverted position over the support 32 at station C, Fig. 1, with the mold open as shown in Fig. 5, the conveyor 1 (which is in continuous motion) moves the casting unit to the left toward the feeder and a stationary, adjustably positioned, track side trip 88 engages the lever 37 just prior to entering the curved section of the track and before the feeder is lowered to thereby cause the sections of the appendage mold to close. If the ware is applied off center (and it is not necessary that it be precisely located on the thrustor) the mold sections will nudge the ware into approximately proper position. After the mold sections have closed, continued movement of the lever 37 advances the thrustor 32 to first finally position the ware, then press the adjacent portion of ware wall against the contoured surface of the mold in leakproof sealing relation with the opening of the molding cavity. As the lever 37 approaches its limit of movement, link 43 travels over the center of lever 37 to thereby lock the mold halves together and the "thrustor" against the internal wall of the ware.

As the mold enters the arcuate section 7 of the track, the orifice of a selected overhead feeder comes into registry with the charging well 24d of the mold. Immediately after registry, the feeder descends and as soon as the nozzle is seated over the filling opening, the slip control valve is opened to thereby charge the mold with slip. This occurs whilst both the feeder and mold are in motion around the curved section 7 of the track 2. At the approach of the rectilinear portion of the track 2 opposite the loading station C the slip is shut off and the feeder is raised, the feeder continuing on and around the circle to repeat the charging operation on corresponding molds in successive groups of molds.

The ware and mold are preferably conveyed through an appendage setting chamber 83 immediately after the mold is filled. It is preferred to maintain a moist, humid, stagnant atmosphere therein to condition and prevent drying out of the ware whilst the handle is hardening in the mold. This chamber comprises an elongated hood 83 encompassing the track 2 having air-conditioning means for control over the humidity and temperature of the air in the chamber. Thus it is possible to control the humidity of the ware itself and equalize the moisture content therein to that of the handle at the time the handle is removed from the mold, thus avoiding strains from unequal shrinkage. The air-conditioning facilities are diagrammatically represented by ducts 84, thermostats 85 and humidostats 86, which may be disposed at any point desired along the chamber.

As the ware emerges from the chamber 83, an adjustably positioned track side trip 87 engages lever 37 thereby unlocking and unclamping the ware; and opening the mold. The handle by this time has hardened and united to the ware. The operator removes the appendaged ware from the unit, flips off the material formed in the well 24*d* and then smooths the mold joint fin (if any) off the appendage.

The ware is then placed on a conveyor 90 shown in Fig. 2, operating alongside the unloading zone D. It is preferred that this conveyor transport the ware through a drying chamber. In once fired ware, a glaze bath spray machine or bath (not shown) may be located alongside conveyor 90, and the ware glaze coated and then placed on the conveyor. After the ware is dried, it is preferably transferred from the drying conveyor directly to the kiln, the only manual handling being that of applying it to, and removing it from the appendaging machine and placing it in the kiln.

Figure 7:
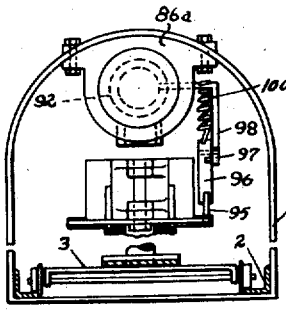
Fig. 7 is a rear elevation of the mold dryer.

To rapidly and within a short portion of conveyor length restore the appendage casting mold to optimum dehydrated condition for refilling, we have provided a drying zone between the unloading point D and loading point C. In this zone is disposed means for force drying and cleaning the mold capable of directing heated dry air at high velocity into the open mold. This means comprises a stationary elongated chamber 91, Fig. 1, partly covering the track 2. Two aligned bearings 86*a* secured to the chamber support a longitudinally movable pipe 92 having a multiple of downwardly directed nozzles 93 having the same center to center spacing as the molds. A flexible hot air supply duct 94, Fig. 1, connected to a source of heated air permits the pipe to move. Each casting unit has an upright pin 94, Fig. 7, positioned so as to engage a pivoted detent 96 on shift bar 97 connected to pipe 92 by angle 98 to thereby propel the pipe along with the conveyor with the nozzles in registry with a multiple of the fully or partly opened molds. When the lead nozzle strikes the end bearing, the pipe is halted and pin 95 pushes the end of detent up and the spring 99, Fig. 7, snaps the pipe back to original position. Spring 100 resets detent 96 which is held in pin engaging position by a detent (not shown), where it is picked up by the next succeeding pin and again moved along with the molds.

Longitudinal air travel may be effected by inclining the nozzles to right or removing the pipe and jetting the air horizontally into the mold issuing end of the tunnel, to thereby apply the driest air to the issuing mold and discarding the spent damp air at the mold entrance end. The nozzles may be directed at an angle to the vertical so that the air will strike the cavity at an oblique angle instead of blowing straight down. Also, the nozzles may be Siamesed so that each mold section will be independently served.

Air impinged angularly at high velocity against the walls of the molding cavity thoroughly dries and hardens the sharp marginal edges of the molding cavity. This extends the useful life of the mold particularly when it is done between fillings as herein. The longer these marginal edges remain sharp the less likelihood there is of producing undesirable fins along the seam.

Scavenging the mold after each filling dislodges electrolytic salts and other bits of material which might adhere to the wall of the molding cavity. Thus, the pores of the mold are kept open and its ability to absorb water not impeded. By drying the mold and keeping its pores clean, the time required to solidify an appendage should remain substantially constant.

In a system where continuity of production is depended upon the performance of operations on a time table basis, the matter of restoring molds to optimum condition becomes highly important if not vital to the reliable operation of the system.

Scavenging the mold also cleans the mating surfaces of foreign particle which otherwise might prevent perfect mating of the two mold sections. Imperfect mating would undoubtedly result in leakage thereby smearing the opposite faces of the mating mold sections with slip which would shorten the useful life of the mold. By taking steps to avoid the condition, manual inspection and cleaning, which otherwise would be necessary, is eliminated.

In manual practice, large rectangular molds measuring about 14 x 14 x 2¼ thick containing about 24" handle cavities are employed. These invariably warp during curing, thus leaving clearance in certain zones between the opposing faces sufficient for slip to flow into and leave a fin of varied thickness and height on the handle. This has to be manually cut off.

In avoiding this, we cast the molds in individual cases to thereby minimize warpage and the occurrence of undesired clearance. Our mold is made as small as practical and for conventional cup handles would measure about 3 x 1½ wide x 1¼ thick, thus practically eliminating warpage and incidentally reducing plaster volume and cost per mold at least 70%. The mold has a thin section as compared with standard manual molds and this combined with forced drying prevents premature internal rot and deterioration, from moisture which the mold absorbs.

Vastly increased mold life, low cost molds and convenient exchange of molds, enables and automatically insures continuous production of perfect handles since it discourages retention of blunted cavity edge or otherwise defective molds, through increased labor required by emptier attendant to remove the fin or eradicate other defects.

One advantageous feature of this invention is that it eliminates high priced skilled labor and insures dependable perfection uniformity in shapes, location and bond value of appendages on all ware. They are put on straight vertically and radially which improves the appearance of the finished product and increases its sale value.

Another advantage is that the process is selectively continuous so that interruption or exhaustion of supply of one or more ware shapes does not detrimentally effect normal production of the remaining ware shapes, thus eliminating handle or mold storage, losses and labor expense incident thereto.

Another advantage is that ware of various sizes and shapes can be appendaged in rapid succession and the appendages can be of different size, configuration, color or material suited to the ware to which it is applied. Furthermore, by variably coloring or applying distinguishing indicia to each type of mold, the identity thereof can be instantly and raliably established by the operator and the proper ware applied to the proper unit, thus preventing errors where the production diversification is extensive.

Another advantage is that shape changes may be quickly accomplished either by pulling the mold sections off the hinge pin and replacing them with another set or by lifting out the plaster inserts, while the machine is in motion thereby saving considerable time and avoiding production interruption. Furthermore, the molds can be made up before hand to proper sizes and specifications and stored in segregated bins convenient to the operator who will be in a position to detect worn molds and quickly replace the same.

Another advantage is that the system can be set up and operated in synchronized conjunction with the continuous operating chain dryer conveyor of an automatic ware forming machinery and adds one more step toward placing the manufacture of appendaged ware on a line production basis with a constant flow of articles along a prescribed path, free of operational interruption and time consuming production lags which is so characteristic of manual production.

Another advantage is that the waste material can be disposed of without loss of time or extra motions and the molds are kept cleaner and the ware protected from contamination. Furthermore, the speed with which the mold can be exchanged does not interfere with the operator loading or unloading the conveyor.

Another advantage is that the feeder automatically refuses to function if there is no ware on the support, thus avoiding spilling slip over the mold faces, chain, etc., and slip wastage.

Another advantage is that the ware is not allowed to dry out while the appendage is solidifying and both the appendage and ware are substantially equal in moisture content when removed from the conveyor, thereby minimizing the possibility of warped or sprung appendages.

Another advantage is that the ware is held in leakproof sealed relation with the margins of the cavity thus clearly defining the juncture margins and facilitating streamlining and blending the handle juncture through a fillet, thus producing a super quality joint and bond generally known as a "welded joint" having double strength of joints employed on conventional ware. It is impossible in practice to obtain an air-tight seal between the adjacent faces of the mold and this provides sufficient vent for escape of all air from the mold cavity, without permitting entrance of slip.

Another advantage is that by providing more than one feeding station, a more viscous slip can be employed in one or more stations and the need for a large capacity reserve well is eliminated. The secondary feeding station or stations can be located at or about the point where the orifice clogs or original supply becomes depleted and slip under a different hydrostatic head or composition employed. Thus, the amount of waste material is sharply reduced, the well can be made smaller, orifice clogging and appendage cavitation is reliably avoided.

A further advantage is that the slip flows in a closed conduit from a container into the molding cavity and abuts against the wall of the cup, the cavity serving as a charge volume measuring chamber, thus eliminating complicated valving and volume control mechanism. Tedious calculations and presetting of charge volume, contamination and air entrapment enroute is avoided.

Another advantage is that by proper partitioning of the slip container, slip of different color, composition, fluidity, etc., can be fed to succeeding molds.

It will be understood that the conveyor may be provided with pairs of casting units arranged in side by side relation straddling the conveyor chain. Feeding of clay to the molds can be accomplished by providing a double circle of feeders in an obvious manner.

In regard to the matter of solidifying appendages, while an ideal arrangement is one wherein means are provided, such as the setting chamber disclosed, in which atmospheric conditions congenial to the ware can be established, we do not limit ourselves to the use of this chamber as a means for exclusively retarding the dehydration of the ware since it may be used to promote accelerated handle drying by raising the temperature to a point where there is enforced drying of the appendage mold. Normally, the absorption capacity of the molds will be such that before the saturation point is reached, all the water that is to be abstracted from the slip will be abstracted. Thus evaporation of liquid constituents absorbed by the mold from the surface of the mold would not be necessary, however, if the absorption capacity of the molds was below the amount of water to be absorbed then, the temperature in the chamber could well be raised to promote evaporation of liquid constituents from the mold. We have found that the system may operate without a conditioning chamber and that the chain may simply be extended back into the factory and the solidification carried out at room temperature. Moreover, we have noted that the article of ware itself is instrumental in solidifying the appendage. The ware is damp and water will capillary thereinto from the slip and be evaporated from the surface of the ware. By retarding dehydration, through providing a moist atmosphere highly saturated with water vapor, the mold absorbs the major portion of the water in the slip, but whether the atmosphere in the chamber is dry or humid, the zone of the article in the vicinity of the appendage terminal appears to remain quite damp due to capillary abstraction of water by the ware and as long as this condition exists we have found that the ware can be appendaged in open air. In other words, we wish it understood that a conditioning chamber is not absolutely essential and may be omitted without departing from the spirit and scope of this invention.

The entire machine may be operated in a periodic fashion, that is to say, a predetermined number of molds may be filled and run into the conditioner. The machine may be stopped for an interval necessary to solidify the appendages and then started up again in order to strip the ware and re-load the conveyor. A machine operated in this manner could have a smaller number of molds and would probably be advantageous in small plants where production requirements would not demand continuous operation.

Having thus described our invention what we claim is:

1. In combination with apparatus for advancing a line of appendage casting molds and prefabricated ware along a path wherein appendages are slip cast in said molds and united to the ware, means arranged to feed charges of slip to said molds whilst moving in said path, an appendage setting chamber through which the apparatus travels and means for reconditioning empty molds.

2. The method of manufacturing appendaged pottery ware which comprises advancing a line of appendage casting molds and prefabricated ware along a predetermined path, feeding charges of slip to said molds whilst moving along one portion of said path, in another portion of the path solidifying and uniting the appendages to the ware and in another portion of the path opening the molds to atmosphere prior to refilling.

3. In combination with apparatus for advancing a line of appendage casting molds and prefabricated ware along a path wherein appendages are slip cast in said molds and united to the ware, means for feeding slip into said molds mechanically synchronized to move with said molds in a portion of said path and a chamber through which the apparatus travels in which the appendages become solidified.

4. The method of manufacturing appendaged pottery ware which comprises advancing a line of appendage casting molds and prefabricated ware along a predetermined path, feeding charges of slip to said molds whilst moving in said path and thereafter solidifying the appendages in the molds in an atmosphere congenial to solidifying and uniting the appendage to the ware.

5. In combination with apparatus for advancing a line of appendage casting molds and prefabricated ware along a path wherein appendages are slip cast in said molds and united to the ware, movable means for feeding charges of slip to said molds and means for mechanically synchronizing the movement of the feeding means and molds whilst moving in said path.

6. The method of manufacturing appendaged pottery ware which comprises advancing a line of appendage casting molds and prefabricated ware along a predetermined path, feeding charges of slip to said molds whilst moving in said path, opening the molds and removing the appendage therefrom and reconditioning the empty molds prior to refilling.

7. The method of manufacturing appendaged pottery ware which comprises advancing a line of appendage casting molds and prefabricated ware along a predetermined path, slip casting appendages in said molds and uniting the same to the ware in a portion of said path, in another portion of said path solidifying the appendages whilst retarding dehydration of the ware and in another portion of said path restoring the molds to optimum condition for refilling.

8. In combination with apparatus for advancing a line of appendage molds and prefabricated ware along a path wherein appendages are slip cast in said molds and united to the ware, one or more movable slip discharge nozzles through which slip is fed arranged above the general path of travel of the molds and adapted to feed charges of slip to molds whilst moving in said path and means for mechanically synchronizing the movement of the discharge nozzle or nozzles and the molds.

9. In the manufacture of appendaged pottery ware the method which comprises preforming the body of the ware, pressing the ware and an appendage mold into leakproof sealed relation around a cavity opening of the mold in registry with the place on the ware determined upon for the appendage and thereafter slip casting an appendage in the mold to unite with the ware.

10. In the manufacture of appendaged pottery ware the method which comprises preforming the body of the ware, bringing the ware and an appendage mold into leakproof sealed relation with a cavity opening of the mold in registry with the place on the ware determined upon for the appendage thereafter bringing the filling opening of the mold into sealed relation with a conduit filled with slip and discharging slip into the molding cavity until the molding cavity is filled.

11. In combination with apparatus for advancing a line of appendage casting molds and prefabricated ware along a path wherein appendages are slip cast in said molds and united to the ware, a slip discharge nozzle through which said slip is fed arranged above the general path of travel of the molds and adapted to feed charges of slip to said molds and means for precluding the passage of slip through the nozzle into a mold except when there is ware in association with the mold.

12. In combination with apparatus for advancing a line of appendage casting molds and prefabricated ware along a path wherein appendages are slip cast in said molds and united to the ware, a slip discharge nozzle through which slip is fed arranged above the general path of travel of the molds and adapted to feed charges of slip thereinto and one or more nozzles located at points remote from the first named nozzle through which additional charges of slip may be fed to the molds.

13. In the manufacture of appendaged pottery ware, the method which comprises, advancing a line of appendage molds along a predetermined path and in portions of the path disposing articles of ware against the molds in such fashion as to bring the cavity opening in the mold into registry with the place on the ware determined upon for the appendage, introducing slip into the mold to form an appendage united with the ware and adding slip to the original charge at one or more points along the path.

14. In the manufacture of appendaged pottery ware, the method which comprises, circulating a group of diverse or similar appendage molds in an endless path and in portions of the path disposing articles of pottery against the cavity of said molds, then feeding charges of slip thereto, transporting the molds and ware through a congenial atmosphere whilst the appendage is solidifying and thereafter removing the ware from the path and returning the molds for refilling.

15. In combination with apparatus for advancing a line of separable appendage casting molds and prefabricated ware along a path wherein appendages are slip cast and united to the ware, a plurality of slip discharge nozzles through which slip is fed arranged above the general path of travel of the molds and adapted to feed charges of slip to molds whilst moving in said path, and means for gripping the ware in sealed relation with the molds in registry with the cavity opening or openings therein.

16. In combination with apparatus for advancing a line of appendage casting molds and prefabricated ware along a path wherein appendages are slip cast in said molds and united to the ware, means for feeding clay to molds comprising a plurality of discharge nozzles arranged above the path of travel of said molds and adapted to feed charges of slip thereto whilst moving in said path, means for lowering said nozzles into sealed relation with the filling opening of said molds, a valve associated with each nozzle for controlling the discharge of slip therethrough and means operable to open said valve after the nozzle has engaged the mold.

17. In combination with apparatus for advancing a line of separable appendage casting molds and prefabricated ware along a path wherein appendages are slip cast in the molds and united to the ware, a plurality of slip discharge nozzles through which slip is fed arranged above the general path of travel of the molds and adapted to feed charges of slip to molds whilst moving in said path, a chamber through which the molds and ware are transported subsequent to mold filling having means for regulating the humidity and temperature of the air therein, means for automatically opening and closing said molds and a mold drier comprising a plurality of discharge nozzles through which drying air is applied to the molds arranged above the general path of travel of the molds and adapted to apply heated air to the molds whilst moving in said path.

18. In combination with apparatus for slip casting and uniting appendages to prefabricated pottery ware, a conveyor for transporting appendage molds along a path wherein appendages are formed and attached to the ware composed of a single strand of chain with appendage molds attached thereto arranged with predominately horizontal ascending and descending courses in the zone of appendage solidification.

19. In the mass production manufacture of appendaged pottery ware the method which consists in advancing appendage molds in repeated closed cycles through an appendage setting zone and a filling unit and automatically slip casting and uniting appendages to prefabricated ware all whilst the appendage molds are in continuous motion.

20. In the manufacture of appendaged pottery ware the method which consists in advancing a line of diverse appendage molds and prefabricated pottery ware along a path wherein appendages are slip cast in said molds and united to the ware and providing individual identification for the molds by means of which the proper size and shape of article may be selected for cooperation therewith.

21. In combination with apparatus for advancing a line of separable appendage casting molds and prefabricated ware along a path wherein appendages are slip cast and united to the ware, a plurality of slip discharge nozzles through which slip is fed arranged above the general path of travel of the molds and adapted to feed charges of slip to molds whilst moving in said path and means for automatically opening and closing said molds said last named means being adjustable in order to vary the time of opening and/or closing of molds in the production cycle or the point or location of opening or closing relative to the path of travel of the molds.

22. In combination with apparatus for advancing a line of appendage casting molds along an endless path, means associated therewith for supporting prefabricated ware, slip feeding means mounted for movement with the molds, means for mechanically synchronizing the movement of the feeding means and molds, and flow control mechanism for governing the discharge of slip into the molds.

23. In combination, a line of travelling pottery-casting molds, a slip discharge nozzle having synchronized movement with the line of molds and adapted to co-operate and travel with successive molds moving in the path, and flow control mechanism operable to discharge slip through the nozzle upon movement of the nozzle into feeding position.

24. In combination, a line of travelling pottery-casting molds, a slip discharge nozzle having synchronized movement with the line of molds and adapted to co-operate and travel with successive molds, means for raising and lowering said nozzle relative to the molds and flow control mechanism operable in response to raising and lowering of said nozzle to govern the discharge of slip into the molds.

25. In combination, a line of travelling pottery-casting molds, a slip discharge nozzle having synchronized movement with the line of molds and being adapted to feed slip to successive molds, said molds and nozzle being relatively movable when travelling in unison and flow control mechanism for governing the discharge of slip into the molds operable upon relative movement of the nozzle and molds.

26. In combination, a line of travelling pottery-casting molds moving in a curved path about an axis, a plurality of slip discharge nozzles synchronized for movement with the molds and travelling in a concentric circular path into and out of registration with successive molds, flow control means associated with each nozzle for governing the discharge of slip through said nozzle and means for actuating said last named means during the interval of association of a nozzle and mold in order to fill the mold with slip, and interrupt the discharge of slip prior to disassociation of the mold and nozzle.

27. The combination with a continuously rotating feeder of an endless flexible conveyor for continuously moving a line of pottery molds along a path tangent to the circle of rotation of the feeder and then in a curved path concentric with the axis of rotation of the feeder to bring successive molds into registration with said feeder, and means for causing said feeder to deliver charges of clay to successive molds during the interval said feeder and successive molds are in registration.

28. In combination, clay feeding apparatus having a rotatable support associated therewith rotatable about a vertical axis, clay feeders mounted above said support rotatable therewith about said axis, endless flexible mold conveying means looped about said support, pottery molds mounted on said conveying means to be carried thereby to said support and transported about said axis in register with said feeders, means for feeding clay from said feeders into said molds when in register therewith and means operable to continuously drive said conveying means and support.

29. Apparatus for manufacturing dinnerware and the like comprising a support for carrying molds in a curved path through a mold charging zone, a clay discharge nozzle movable in a path concentric with the axis of the curved path, and an endless flexible conveyor arranged to travel around said support to carry empty molds to the mold charging zone and remove them therefrom.

30. Apparatus for manufacturing dinnerware and the like, comprising a support for carrying molds through a feeding zone including a stationary track, an angularly moving feeder in said zone for charging the molds and a mold conveyor for transporting empty molds over the track through the feeding zone and carrying them away when loaded.

31. Apparatus for manufacturing appendaged pottery-ware comprising a support for carrying appendage molds and ware carriers in a curved path through a mold filling zone, a clay discharge nozzle movable in a path concentric with the axis of the curved path for filling said molds with clay and an endless flexible conveyor having appendage molds and ware supports attached thereto, said conveyor being arranged to travel around said support to carry empty molds to the mold filling zone and remove them therefrom.

32. In combination with a plurality of pottery forming molds, a plurality of feeders mounted for rotation about a common axis, and a continuously driven, endless, flexible conveyor for supporting the molds having a portion arranged to travel in a horizontal path concentric with the axis for rotating the feeders thereabout and causing them to function and discharge clay onto the molding surface of the molds supported by the conveyor.

33. In combination with a plurality of clay discharge nozzles arranged to rotate continuously about a common axis, a continuously traveling endless mold conveyor arranged to travel in a path concentric with the axis through a feeding zone to carry molds into register with said nozzles and then carry them away after they are charged with clay and means operable to feed a charge of clay from a nozzle to a mold during the interval of registration of a nozzle with a mold in the feeding zone.

34. In combination with a plurality of clay discharge nozzles arranged to rotate continuously about a common axis, a continuously traveling endless mold conveyor arranged to travel in a path about said axis through a feeding zone to carry molds into register with said nozzles and carry them away therefrom when charged with clay, means for supporting said mold conveyor in the feeding zone and means operable to feed a charge of clay from a nozzle to a mold during the interval the nozzle is in registration with a mold in the feeding zone.

35. In combination with a plurality of clay discharge nozzles arranged to rotate continuously about a common axis, a continuously traveling, endless mold conveyor arranged to travel in a curved path about said axis to carry molds into register with said nozzles, and means for discharging clay from a nozzle into a mold when the two are in register.

WILLIAM J. MILLER.
ASHLEY J. REEK.